(12) United States Patent
Jouanneau et al.

(10) Patent No.: US 7,396,614 B2
(45) Date of Patent: Jul. 8, 2008

(54) LITHIUM AND VANADIUM OXIDE, A PREPARATION METHOD THEREOF AND THE USE OF SAME AS AN ACTIVE ELECTRODE MATERIAL

(75) Inventors: Séverine Jouanneau, Saint Barthélémy d'Anjou (FR); Dominique Guyomard, Sautron (FR); Annie Le Gal La Salle, La Chapelle sur Erdre (FR); Alain Verbaere, La Chapelle sur Erdre (FR); Stéphane Lascaud, Fontainebleau (FR); Nelly Bourgeon, Saint-Herblain (FR); Marc Deschamps, Quimper (FR)

(73) Assignee: Centre National de la Recherche Scientifique, Paris (FR)

( * ) Notice: Subject to any disclaimer, the term of this patent is extended or adjusted under 35 U.S.C. 154(b) by 781 days.

(21) Appl. No.: 10/493,758

(22) PCT Filed: Oct. 8, 2002

(86) PCT No.: PCT/FR02/03424

§ 371 (c)(1),
(2), (4) Date: Oct. 4, 2004

(87) PCT Pub. No.: WO03/036742

PCT Pub. Date: May 1, 2003

(65) Prior Publication Data

US 2005/0026041 A1    Feb. 3, 2005

(30) Foreign Application Priority Data

Oct. 25, 2001    (FR) .................................. 01 13821

(51) Int. Cl.
H01M 4/58    (2006.01)
H01M 4/62    (2006.01)
C01G 31/02    (2006.01)
C01D 15/02    (2006.01)

(52) U.S. Cl. .................... 429/231.2; 429/232; 429/217; 429/231.95; 423/594.17; 423/641

(58) Field of Classification Search ............... 429/231.2, 429/232, 217, 213.95; 423/594.17, 641
See application file for complete search history.

(56) References Cited

U.S. PATENT DOCUMENTS 5,520,903 A    5/1996    Chang et al.

FOREIGN PATENT DOCUMENTS

| JP | 1-296567 A | 11/1989 |
| JP | 2-267857 A | 1/1990 |
| JP | 3-225774 A | 4/1991 |
| JP | 6-171947 A | 6/1994 |
| JP | 10-116628 A | 5/1998 |
| WO | WO 00/44673 A1 | 8/2000 |

OTHER PUBLICATIONS

Zhang et al., "Spectroscopic investigation of $Li_{1+x}V_3O_8$," Electrochimica ACTA, Elsevier Science Publishers, Barking, GB, vol. 43, No. 8, pp. 861-868, 1998.

Panero et al., "Rechargeable $Li/Li_{1+x}V_3O_8$ Cells," Journal of the Electrochemical Society, pp. 1225-1227, May 1983.

DePicciotto et al., "Structural characterization of $Li_{1+x}V_3O_8$ insertion electrodes by single-crystal X-ray diffraction"; Solid State Ionics 62, pp. 297-307, 1993.

Benedek et al., "Structure and electrochemical potential simulation for the cathode material Li1+xV3O8", Chemical Abstracts Service, Columbus, Ohio, US; XP002206060, 1998.

Search Report issued in International Application No. PCT/FR02/03424.

*Primary Examiner*—Patrick Ryan
*Assistant Examiner*—Thomas H. Parsons
(74) *Attorney, Agent, or Firm*—Buchanan Ingersoll & Rooney PC

(57) ABSTRACT

A lithium and vanadium oxide is described having the formula $Li_{1+x}V_3O_8$, wherein $0.1 \leq x \leq 0.25$. The oxide has a monoclinic crystalline structure and comprises non-agglomerated grains in the form of monocrystalline pellets having a length L of between 1 and 100 μm, a width W such that 4<L/W<100, and a thickness t such that 4 L/t<100, with t<W, the elongation axis of the pellets being axis b of the monoclinic cell. The oxide may be prepared by mixing the Li and V precursors, without grinding or compression, heating said mixture to 565° C.-585° C. and de-agglomerating the product obtained. The oxide is suitable for use as an active material for the positive electrode of a lithium battery.

40 Claims, 3 Drawing Sheets

LITHIUM AND VANADIUM OXIDE, A PREPARATION METHOD THEREOF AND THE USE OF SAME AS AN ACTIVE ELECTRODE MATERIAL

BACKGROUND OF THE INVENTION

1. Field of the Invention

The present invention relates to a lithium vanadium oxide, to a process for its preparation, and to its use as cathode active material in a lithium battery.

2. Description of the Related Art

The main properties desired for a material intended to be used as cathode active material in a lithium battery are a high specific energy (which is the product of the capacity and the average potential) and a long cycling lifetime. The material $Li_{1+x}V_3O_8$, which has been widely studied, makes it possible to obtain a high capacity, of greater than 150 Ah/kg during the first discharges, but this capacity decreases fairly rapidly with the number of charge/discharge cycles. Various processes for the preparation of $Li_{1+x}V_3O_8$ by reaction of $Li_2CO_3$ and $V_2O_5$ are described in the prior art. Thus, Hammou, et al. [Electrochim. Acta, 13 (1988), 1719] describe a process for the preparation of lithium vanadium oxide in which the reactants react in the air at 590° C. for 6 h, and the use of the oxide obtained in a Li-polymer battery. However, this temperature is very close to the melting point, the result of which is a sintering of the powder, which has to be milled before being used in the preparation of a composite electrode. The study of the cycling behavior shows a loss in capacity of the order of 15% between the 1st and the 15th cycle. U.S. Pat. No. 6,136,476 discloses a process in which the reactants are heated at a temperature below the melting point, preferably between 350° C. and 550° C., after having mixed the reactants using an air jet disintegrator for the purpose of reducing the size of the particles and of homogenizing the distribution in the size of the grains. Other techniques for the preliminary mixing of the reactants are mentioned, in particular the use of rotary drum mixers, of vibration mills or of bead mills. Chaloner-Gill, et al [J. Electrochem. Soc., 147, (10) 3575-3578 (2000)] describe a process comprising a sequence of stages, namely: milling the mixture of reactants, heating in the air at 585° C. for 16 h, cooling and remilling, second heating in the air at 585° C. for 16 h, and reaction with $Li_2S$. The material obtained is used as cathode active material in a lithium battery and it is recorded that the capacity decreases significantly with the number of charge-discharge cycles. U.S. Pat. No. 5,520,903 discloses a process which consists in milling the reactants for the purpose of mixing them and of reducing the size of the grains, in compressing, in order to form a compact powder, and in then heating the compressed mixture at a temperature of between 580 and 585° C. In this case, the product obtained is an agglomerate of microcrystalline grains fused to one another which has to be milled before being used as electrode material. The milling certainly gives free grains but it also results in the loss of the monocrystalline morphology of rods and crushed polycrystalline grains are obtained. It is recorded that, in a specific embodiment, without compression, the product obtained after heating comprises a not insignificant amount of impurities of the $V_2O_5$ type.

SUMMARY OF THE INVENTION

The aim of the present invention is to provide a lithium vanadium oxide which exhibits improved properties when it is used as active material of the cathode of a lithium battery, and a simplified process for its preparation.

The compound according to the present invention corresponds to the formula $Li_{1+x}V_3O_8$ in which $0.1 \leq x \leq 0.25$, it has a monoclinic crystalline structure and it is characterized in that it is composed of nonagglomerated grains in the form of monocrystalline rods:
which have a length l of between 1 and 100 μm, a width w such that 4<l/w<100, and a thickness t such that 4<l/t<100, with t<w;
the elongation axis of which is the b axis of the monoclinic unit cell.

Preferably, the respective dimensions are such that 10<l/w<50 and 10<l/t<50.

In the grains forming the compound of the invention, the width w corresponds to the (100) crystalline face, which is the biggest face.

The morphology of the compound of the invention can be determined by scanning microscopy, for example using a high resolution scanning electron microscope of Jeol JSM 6400F type, giving magnifications of ×1000 to ×30 000.

The process for the preparation of the compound of the invention consists in reacting at least one Li precursor with at least one vanadium precursor and it is characterized in that:
the Li precursor(s) and the V precursor(s) in the powder form are introduced into a mixer in the stoichiometric proportions Li/V=(1+x)/3;
the mixing is carried out under conditions such that, after the mixing, the density of the mixture obtained is less than 1.5 and the dimensions of the powder grains are such that their length is greater than 1 μm, their width is greater than 0.1 μm and their thickness is greater than 0.1 μm;
the mixture obtained is brought to a temperature of between 565° C. and 585° C., preferably between 575° C. and 585° C., and this temperature is maintained for a period of time of between 30 min and 10 h;
the product obtained is deagglomerated in order to separate the powder grains without milling them.

The lithium precursor can be chosen from lithium salts and lithium oxides. Mention may be made, by way of examples, of $Li_2CO_3$, $LiNO_3$, $LiOH$, $LiOH \cdot H_2O$ and $Li_2O$. Mention may also be made of organic salts, such as lithium acetylacetonate, lithium acetate, lithium stearate, lithium formate, lithium oxalate, lithium citrate, lithium lactate, lithium tartrate or lithium pyruvate. The vanadium precursor can be chosen from vanadium salts and vanadium oxides. Mention may be made, by way of examples, of $\alpha\text{-}V_2O_5$, $NH_4VO_3$, $V_2O_4$ and $V_2O_3$. Of course, the salts can be used alone or in the form of mixtures of at least two of them. In a specific embodiment, the lithium precursor can be a mixed compound of Li and of V, for example $LiVO_3$, $Li_3VO_4$ and $LiV_2O_5$; in this case, the lithium precursor contributes a portion of the required amount of vanadium and it is sufficient to introduce the amount of vanadium precursor necessary to achieve the stoichiometry indicated above.

The process according to the invention makes it possible to obtain the $Li_{1+x}V_3O_8$ compound in a pure form. Analysis by X-ray diffraction confirms the absence of traces of impurities, in particular of $V_2O_5$.

The stage of mixing reactants is intended to produce a homogeneous mixture of the reactants while avoiding a reduction in size of the grains of reactants. This is because, below a certain grain size and above a certain density of the mixture of reactants, the reaction for the formation of $Li_{1+x}V_3O_8$ at a temperature in the vicinity of 580° C. results in crystalline growth of rods fused to one another. Gentle mixing, such as employed in the process of the invention, can be carried out, for example, in a Pulverisette 7, sold by Fritsch, when the amount of mixture to be treated is of the order of a few grams, or in a fluidized bed mixer, horizontal drum mixer or screw mixer (for example, a VMI/Rayneri mixer of R51 type), when the amount to be treated is of the order of a few kilograms.

A $Li_{1+x}V_3O_8$ compound according to the present invention can advantageously be used as active material for the positive electrode of a rechargeable battery, which constitutes another subject matter of the present invention.

DETAILED DESCRIPTION OF THE PREFERRED EMBODIMENTS

Figure 1:
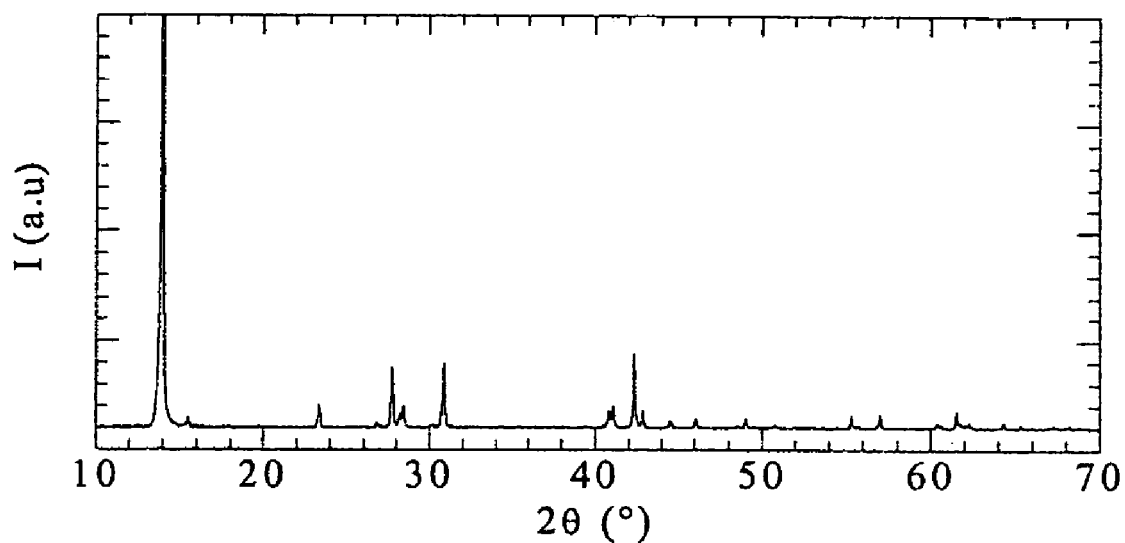
FIG. 1 is an X-ray diffraction diagram of a compound according to the invention.

In a specific embodiment, a positive electrode according to the present invention comprises a lithium vanadium oxide according to the present invention as active material, a material which confers electron conduction properties and a composite material which confers ionic conduction properties and mechanical properties. The active material content is preferably between 40 and 90% by weight, and more particularly between 50 and 65% by weight. The content of material which confers an electron conduction is preferably between 5 and 20% by weight, more particularly between 10 and 15% by weight. The content of composite material which confers the ionic conduction and the mechanical properties is preferably between 5 and 40% by weight, more particularly between 25 and 35% by weight.

The material which confers ionic conduction properties and mechanical properties on the positive electrode is composed of a binder and of a lithium salt. The lithium salt is advantageously chosen from $LiClO_4$, $LiPF_6$, $LiAsF_6$, $LiBF_4$, $LiR_FSO_3$, $LiCH_3SO_3$, lithium bisperfluoroalkylsulfonimides, or lithium bis- or trisperfluoroalkylsulfonylmethides, among which lithium bistrifluoromethylsulfonimide is particularly preferred. The binder is an organic binder which is electrochemically stable up to a potential of 4 V vs Li. The binder can be composed of a nonsolvating polymer and at least one polar aprotic compound. The nonsolvating polymer can be chosen from vinylidene fluoride homopolymers and copolymers, copolymers of ethylene, of propylene and of diene, tetrafluoroethylene homopolymers and copolymers, N-vinylpyrrolidone homopolymers and copolymers, acrylonitrile homopolymers and copolymers, and methacrylonitrile homopolymers and copolymers. Poly(vinylidene fluoride) is particularly preferred. The polar aprotic compound can be chosen from linear or cyclic carbonates, linear or cyclic ethers, linear or cyclic esters, linear or cyclic sulfones, sulfamides and nitriles. The nonsolvating polymer can carry ionic functional groups. Mention may be made, as examples of such a polymer, of polyperfluoroether sulfonated salts, some of which are sold under the name Nafion®, and polystyrene sulfonate salts. The binder of the composite material which confers ionic conduction properties and mechanical properties on the positive electrode can additionally be a solvating polymer, that is to say a polymer which comprises solvating units comprising at least one heteroatom chosen from sulfur, oxygen, nitrogen and fluorine. Mention may be made, as examples of solvating polymers, of polyethers of linear, comb or block structure, which may or may not form a network, based on poly(ethylene oxide); copolymers comprising the ethylene oxide or propylene oxide or allyl glycidyl ether unit; polyphosphazenes; crosslinked networks based on polyethylene glycol crosslinked by isocyanates; copolymers of oxyethylene and epichlorohydrin as disclosed in FR-9712952; and networks obtained by polycondensation and carrying groups which make possible the incorporation of crosslinkable groups. Copolymers of oxyethylene and of epichlorohydrin are particularly preferred as binder of the composite material of the positive electrode which confers the ionic conduction and the mechanical properties.

The compound which confers electron conduction properties is preferably a carbon black which does not catalyze oxidation of the electrolyte at high potential. Numerous commercially available carbon blacks meet this condition. Mention may in particular be made of the compound Ensagri Super S® sold by Chemetals.

In a particularly preferred embodiment, an electrode according to the invention is composed of a lithium vanadium oxide according to the invention, of a carbon black and of a composite material composed of a poly(ethylene oxide) or a copolymer of ethylene oxide and epichlorohydrin and of lithium bistrifluoromethanesulfonimide, the proportion of composite material being between 5 and 40% by weight, preferably between 25 and 35% by weight.

A composite positive electrode according to the invention can be prepared by mixing the active material and the carbon black in a solution of the binder in an appropriate solvent, by stirring the mixture obtained over a metal disk acting as collector (for example an aluminum disk), and then by evaporating the solvent under hot conditions under a nitrogen atmosphere. The solvent is chosen according to the binder used. By way of examples, cyclopentanone and N-methylpyrrolidone are appropriate solvents for the poly(vinylidene fluoride) binder.

An electrode thus constituted can be used in a rechargeable lithium battery comprising a positive electrode and a negative electrode separated by an electrolyte comprising a lithium salt in solution in a solvent, the operation of which is provided by the reversible circulation of lithium ions in an electrolyte comprising a lithium salt between the electrodes. One of the subject matters of the present invention is such a battery, characterized in that it comprises a positive electrode as described above. The following are distinguished among rechargeable lithium batteries: batteries for which the anode is composed of lithium metal or a lithium alloy, hereinafter denoted by "lithium metal batteries", and "rocking chair" batteries, the anode of which comprises a binder and a material capable of reversibly inserting lithium ions at low redox potential, hereinafter denoted by "lithium ion batteries".

During the assembling of a battery according to the present invention, a $Li_{1+x}V_3O_8$ ($0.1 \leq x \leq 0.25$) oxide is used to constitute the positive electrode, the battery thus formed being found in the charged state.

In a battery according to the present invention, the electrolyte comprises at least one readily dissociable salt in solution in a solvent. Mention may be made, among the salts commonly used in lithium metal batteries or lithium ion batteries, of lithium salts, for example $LiClO_4$, $LiAsF_6$, $LiPF_6$, $LiBF_4$, $LiR_FSO_3$, $LiCH_3SO_3$, $LiN(R_FSO_2)_2$, $LiC(R_FSO_2)_3$ and $LiCF(R_FSO_2)_2$, $R_F$ representing a perfluoroalkyl group having from 1 to 8 carbon atoms or a fluorine atom. Lithium bistrifluoromethanesulfonimide is particularly preferred.

The solvent of the electrolyte can be composed of one or more polar aprotic compounds chosen from linear or cyclic carbonates, linear or cyclic ethers, linear or cyclic esters, linear or cyclic sulfones, sulfamides and nitriles. The solvent is preferably composed of at least two carbonates chosen from ethylene carbonate, propylene carbonate, dimethyl carbonate, diethyl carbonate and ethyl methyl carbonate.

In another embodiment, the electrolyte comprises a solvating polymer and a lithium salt as defined above. Mention may be made, as examples of solvating polymers, of polyethers of linear, comb or block structure, which may or may not form a network, based on poly(ethylene oxide); copolymers comprising the ethylene oxide or propylene oxide or allyl glycidyl ether unit; polyphosphazenes; crosslinked networks based on polyethylene glycol crosslinked by isocyanates; copolymers of oxyethylene and of epichlorohydrin as disclosed in FR-9712952; and networks obtained by polycondensation and carrying groups which make possible the incorporation of crosslinkable groups. Mention may also be made of block copolymers in which some blocks carry functional groups which have redox properties. Of course, the above list is not limiting and any polymer exhibiting solvating properties can be used. In addition, the electrolyte can comprise a mixture of a liquid polar aprotic compound chosen from the polar aprotic compounds mentioned above and of a solvating polymer. It can comprise from 2 to 98% by volume of liquid solvent, depending on whether a plasticized electrolyte with a low content of polar aprotic compound or a gelled electrolyte with a high content of polar aprotic compound is desired. When the polymeric solvent of the electrolyte carries ionic functional groups, the lithium salt is optional.

The solvent of the electrolyte can also comprise a nonsolvating polar polymer comprising units comprising at least one heteroatom chosen from sulfur, oxygen, nitrogen and fluorine. Such a nonsolvating polymer can be chosen from acrylonitrile homopolymers and copolymers, fluorovinylidene homopolymers and copolymers, and N-vinylpyrrolidone homopolymers and copolymers. In addition, the nonsolvating polymer can be a polymer carrying ionic substituents and in particular a polyperfluoroether sulfonate salt (such as an abovementioned Nafion®, for example) or a polystyrene sulfonate salt. When the electrolyte comprises a nonsolvating polymer, it is necessary for it to additionally comprise at least one polar aprotic compound as defined above or at least one solvating polymer as defined above. The presence of a readily dissociable salt is necessary when the polymer present in the electrolyte does not comprise ionic substituents.

In another embodiment, the electrolyte of the battery of the present invention can be an inorganic conducting solid chosen from the compounds generally denoted by Lisicon, that is to say $Li_4XO_4$—$Li_3YO_4$ (X=Si or Ge or Ti; Y=P or As or V), $Li_4XO_4$—$Li_2AO_4$ (X=Si or Ge or Ti; A=Mo or S), $Li_4XO_4$—$LiZO_2$ (X=Si or Ge or Ti; Z=Al or Ga or Cr), $Li_4XO_4$—$Li_2BXO_4$ (X=Si or Ge or Ti; B=Ca or Zn), $LiO_2$—$GeO_2$—$P_2O_5$, $LiO_2$—$SiO_2$—$P_2O_5$, $LiO_2$—$B_2O_3$—$Li_2SO_4$, $LiF$—$Li_2S$—$P_2S_5$, $Li_2O$—$GeO_2$—$V_2O_5$ or $LiO_2$—$P_2O_5$—$PON$ solid solutions.

Of course, the electrolyte of a battery of the present invention can additionally comprise the additives conventionally used in this type of material and in particular a plasticizer, a filler, other salts, and the like.

In a particularly preferred embodiment, the electrolyte is composed of a solid solution of lithium bistrifluoromethanesulfonimide (LiTFSI) in polyoxyethylene or in a copolymer of oxyethylene and of epichlorohydrin, optionally comprising an inorganic filler, such as, for example, magnesia (MgO). The proportion by weight of polymer is between 70 and 90% (preferably between 80 and 85%). The proportion by weight of LiTFSI is between 10 and 30% (preferably between 15 and 20%) and the proportion by weight of inorganic filler is less than 30% (preferably less than 15%).

The negative electrode of a battery according to the invention is composed of lithium metal or a lithium alloy which can be chosen from the alloys β-LiAl, β-LiAl, Li—Pb (for example $Li_7Pb_2$), Li—Cd—Pb, Li—Sn, Li—Sn—Cd, Li—Sn in various matrices, in particular oxygen-comprising matrices or metal matrices (for example Cu, Ni, Fe or Fe—C), or Li—Al—Mn. In addition, the negative electrode can be a composite electrode of the $Li/Li_3N$ or $Li_xPb$-polyparaphenylene type.

When the battery according to the invention is a lithium ion battery, it comprises a composite negative electrode composed of a binder and a material capable of reversibly inserting lithium ions at low redox potential, said composite material being lithiated during a preliminary stage. Such a material can be chosen from natural or synthetic carbonaceous materials. These carbonaceous materials can, for example, be a petroleum coke, a graphite, a graphite whisker, a carbon fiber, mesocarbon microbeads, a pitch coke or a needle coke. The material capable of reversibly inserting lithium ions at low redox potential can additionally be chosen from oxides, such as, for example, $Li_xMoO_2$, $Li_xWO_2$, $Li_xFe_2O_3$, $Li_4Ti_5O_{12}$ or $Li_xTiO_2$, or from sulfides, such as, for example, $Li_9Mo_6S_6$ and $LiTiS_2$, or from oxysulfides. Use may also be made of compounds which make it possible to reversibly store lithium at low potential, such as amorphous vanadates (for example $Li_xNiVO_4$), nitrides (for example $Li_{2.6-x}Co_{0.4}N$, $Li_{2+x}FeN_2$ or $Li_{7+x}MnN_4$), phosphides (for example $Li_{9-x}VP_4$), arsenides (for example $Li_{9-x}VAs_4$) and reversibly decomposable oxides (for example CoO, CuO or $Cu_2O$). The binder is an organic binder which is electrochemically stable in the range of operation of the negative electrode. Mention may be made, by way of examples, of poly(vinylidene fluoride) homopolymers or an ethylene/propylene/diene copolymer. A poly(vinylidene fluoride) is particularly preferred. A composite negative electrode can be prepared by introducing the carbonaceous compound into a solution of the binder in a polar aprotic solvent, by spreading the mixture obtained over a copper disk acting as collector and by then evaporating the solvent under hot conditions under a nitrogen atmospre.

A battery according to the invention comprising a solid electrolyte can be provided in the form of a succession of layers composed respectively of the material of the positive electrode according to the invention and its current collector, the solid electrolyte, and the negative electrode and optionally its current collector.

A battery according to the invention comprising a liquid electrolyte can also be provided in the form of a succession of layers composed respectively of the material of the positive electrode according to the invention and its current collector, a separator impregnated by the liquid electrolyte, and the material constituting the negative electrode and optionally its current collector.

The use as active material of a lithium vanadium oxide according to the invention considerably improves the capacity and the cycling performance of the battery, with respect to the lithium vanadium oxides of the prior art.

The present invention is illustrated in more detail by the examples given below, to which, however, it is not limited.

EXAMPLE 1

Preparation of a $Li_{1.1}V_3O_8$ Compound According to the Invention 472 mg of $\alpha$-$V_2O_5$ powder and 70 mg of $Li_2CO_3$ powder were introduced into a Pulverisette and mixing was carried out at a rate of 200 revolutions/min for 5 min. The mixed powders were subsequently introduced into a reactor and heating was carried out at 580° C. for 10 h. The resulting product was introduced into the Pulverisette and subjected to mixing at 200 revolutions/min for 5 min for the purpose of decompacting the powder particles.

A second sample of oxide was prepared under the same conditions but while heating the powder mixture at 570° C. instead of 580° C.

Preparation of $Li_{1.1}V_3O_8$ Compounds by Way of Comparison

By way of comparison, $Li_{1.1}V_3O_8$ compounds were prepared under the conditions indicated above, successively at the following temperatures: 500° C., 520° C., 560° C., 590° C. and 600° C.

Analysis of the Products Obtained

The composition of the product obtained in each case was determined by X-ray diffraction. The diagrams are in agreement with the PDF sheet No. 80-0071, corresponding to $Li_{1.1}V_3O_8$, and no impurity is detected. The X-ray diffraction diagram (CuK$\alpha$ radiation: $\lambda$=1.5418 Å) of the product according to the invention is represented in FIG. 1.

Figure 2:
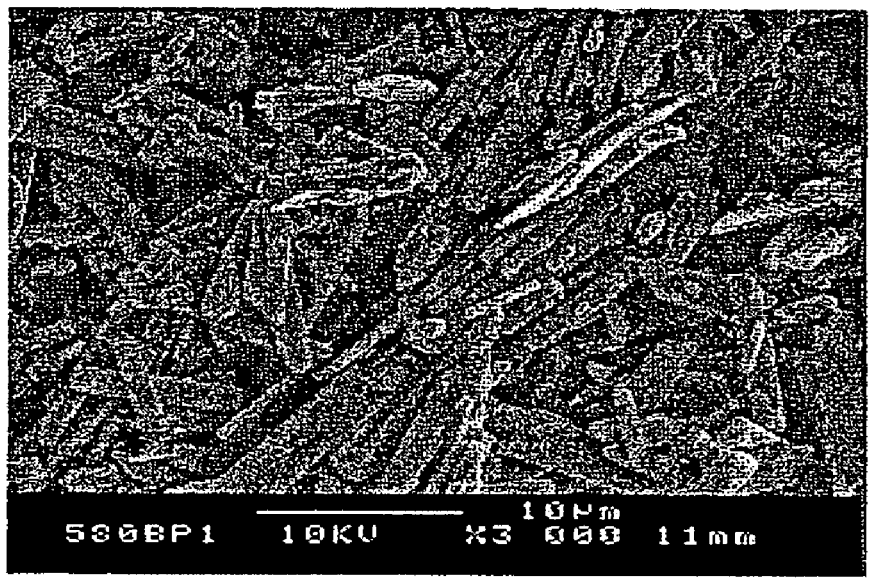
FIG. 2 is a microphotograph of a compound according to the invention.

The morphology of the compound according to the invention and of the compounds prepared by way of comparison was observed with a scanning electron microscope of Jeol JSM 6400F type. The microphotograph obtained for the compound prepared at 580° C. at a magnification of 3000 is represented in FIG. 2. It shows the morphology of microcrystalline rods having a length l of between 5 and 30 μm, a width w of between 0.5 and 2 μm, and a thickness t of between 0.5 and 2 μm. Analysis carried out by laser particle sizing on the LS130 device from Coultronics indicates a distribution of the mean size of the particles between 1 and 10 μm with a mean value of the order of 3.5 μm. Identical results are observed for the compound according to the invention prepared at 570° C.

The morphology of the oxides prepared by way of comparison is as follows:

Oxide prepared at 500° C.: grains which are nonhomogeneous in shape and in size, composed of small polycrystalline rods with a size of the order of a micron for their greatest length.

Oxide prepared at 520° C.: grains which are nonhomogeneous in shape and in size, composed of small polycrystalline rods of the order of a micron for their greatest length.

Oxide prepared at 560° C.: grains which are nonhomogeneous in shape and in size, composed of polycrystalline rods between 1 and 5 μm in length.

Oxide prepared at 590° C.: very similar to that of the oxide prepared at 560° C. but with sintering of the powder.

Oxide prepared at 600° C. (melting point of the oxide): production of a melted block composed of intermingled crystals with a length of greater than or equal to 20 μm.

EXAMPLE 2

Preparation of a $Li_{1.1}V_3O_8$ Compound According to the Invention 4.72 kg of $\alpha$-$V_2O_5$ powder and 0.70 kg of $Li_2CO_3$ powder were introduced into a VMI/Rayneri mixer of R51 type and mixing was carried out at a rate of 80 revolutions/min for 15 min. The mixed powders were subsequently introduced into a reactor and heating was carried out at 580° C. for 10 h. The resulting product was introduced into the mixer and subjected to mixing at 80 revolutions/min for 15 min for the purpose of decompacting the powder particles.

Analysis of the Product Obtained

The X-ray diffraction diagram of the product obtained is in agreement with the PDF sheet No. 80-0071 corresponding to $Li_{1.1}V_3O_8$ and no impurity is detected.

The morphology of the compound prepared was observed with a scanning electron microscope of Jeol JSM 6400F type. The oxide obtained exhibits a morphology of monocrystalline rods having a length l of between 5 and 30 μm, a width w of between 0.5 and 2 μm, and a thickness t of between 0.5 and 2 μm.

An analysis was carried out by laser particle sizing on the LS130 device from Coultronics. It indicates a distribution of the mean size of the particles between 1 and 10 μm with a maximum of the order of 3.5 μm.

EXAMPLE 3

Use of the $Li_{1.1}V_3O_8$ Compound in a Liquid Electrolyte Battery

The $Li_{1.1}V_3O_8$ compounds obtained at 580° C. and at 571° C. respectively according to the process described in example 1 were used as active cathode material in a laboratory screw battery operating at ambient temperature and having the following structure:

Li/(EC+DMC+$LiPF_6$)/$Li_{1.1}V_3O_8$+carbon+binder

The anode is a lithium plate. The solvent of the electrolyte is composed of a mixture of ethylene carbonate and of dimethyl carbonate in the proportions 2/1.

Figure 3:
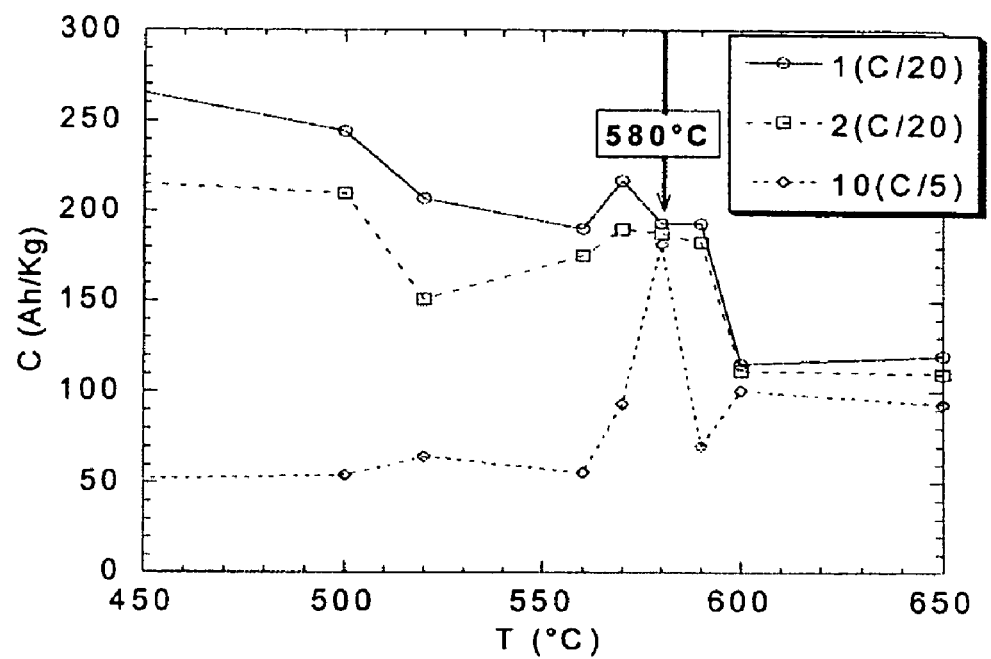
FIG. 3 is a diagram showing the results of tests on battery capacities under different cycling conditions.

In a first series of tests, the capacity was measured under three discharge conditions for two batteries comprising the $Li_{1.1}V_3O_8$ compound of the invention prepared according to example 1 by heating at 580° C. and at 570° C. respectively and for batteries comprising the compounds prepared by way of comparison as described in example 1. For each of the oxides, a battery was assembled comprising said oxide as active cathode material. The capacity C (expressed in Ah/kg) was determined under different cycling conditions, for each of the batteries. The results are represented in FIG. 3. the points represented by ○ correspond to the 1st discharge under C/20 discharge conditions, the points represented by □ correspond to the 2nd discharge under C/20 discharge conditions and the points represented by ◇ correspond to the 10th discharge under C/5 conditions. It is clearly apparent that the capacity greatly decreases as soon as the temperature for preparation of the lithium vanadium oxide departs from the temperature range required for the process of the present invention.

Figure 4:
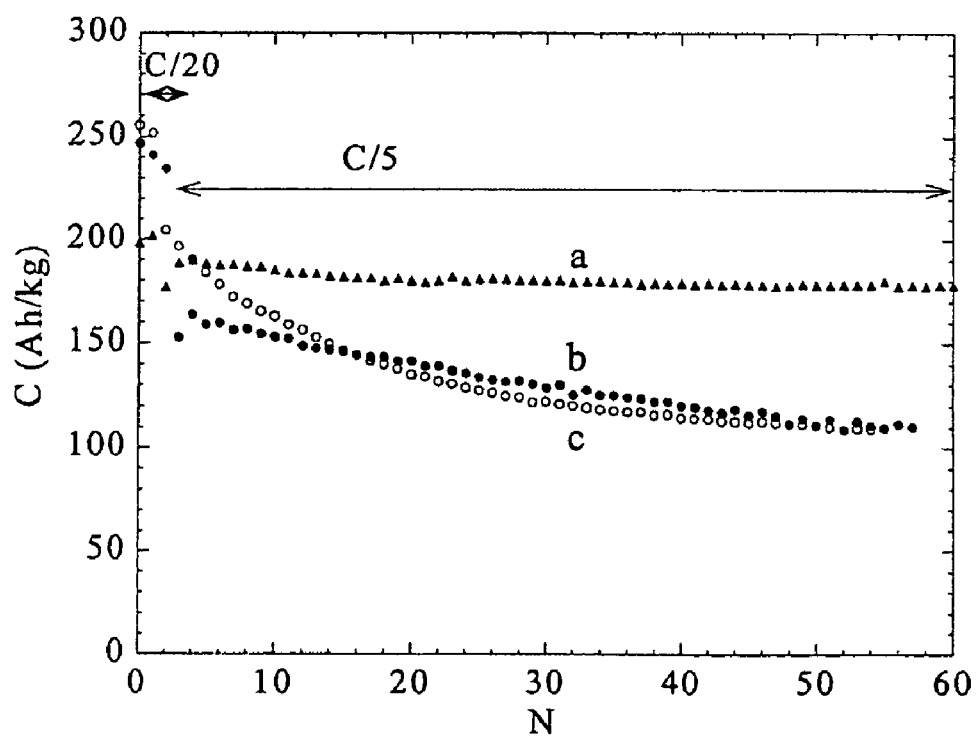
FIG. 4 is a diagram showing the variations in battery capacities as a function of the cycle number.

In a second series of comparative tests, two batteries similar to that of the invention were assembled using, as active material of the cathode, for one, a lithium vanadium oxide obtained by heating a mixture of $\alpha$-$V_2O_5$ and $Li_2CO_3$ at 580° C., followed by milling, and, for the other, a lithium vanadium oxide obtained by milling and compacting the reactants, heating at 580° C. and then remilling. The variation in the capacity C (in Ah/kg) as a function of the cycle number N is represented in FIG. 4. In this figure, the curve (a) corresponds to a battery according to the invention, the curve (b) corresponds to the battery comprising the oxide subjected to milling and the curve (c) corresponds to the battery comprising the oxide obtained by milling the reactants, compacting, heating and remilling. The first three cycles were carried out under C/20 discharge conditions, the following cycles under C/5 conditions. It is clearly apparent that the absence of milling and of compacting before heating and the absence of milling after heating are essential in retaining a higher capacity in cycling.

EXAMPLE 4

Use of the $Li_{1.1}V_3O_8$ Compound in a Polymer Electrolyte Battery

A rechargeable polymer electrolyte lithium battery was prepared.

The electrolyte is a film having a thickness of 30 μm composed of LiTFSI (20% by weight), in solution in an ethylene oxide polymer (70% by weight), and a magnesium oxide (10% by weight). The electrolyte film is obtained by extrusion. The anode is a lithium sheet having a thickness of 50 μm. The cathode is a composite cathode in the form of a film having a thickness of 30 μm and obtained by extrusion, and it comprises approximately 54% of vanadium oxide $Li_{1.1}V_3O_8$ obtained at 580° C. according to the process of example 1, approximately 14% of acetylene black, approximately 24% of an ethylene oxide polymer and approximately 8% of LiTFSI, the proportions being expressed by weight. The cathode, which has a surface area in the region of 4500 cm², was laminated on an aluminum-based collector with a thickness of 15 μm. The battery was assembled by winding and pressing the various films under hot conditions at 60° C.

Figure 5:
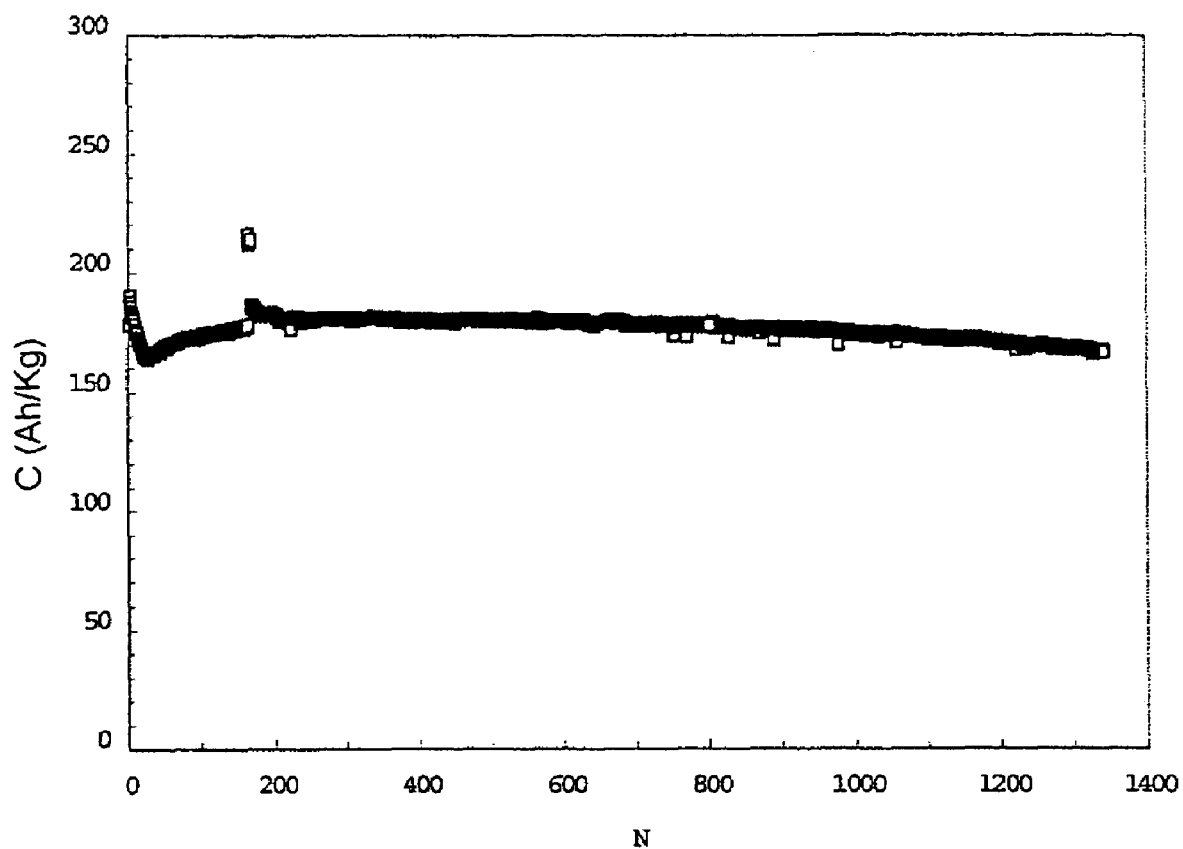
FIG. 5 is a diagram showing variations in lithium battery capacities as a function of the number of cycles.

The battery thus formed is cycled at a temperature of 90° C. The charge current is C/4 and the discharge current is C/1.5. The change in the capacity C (in Ah/kg) as a function of the number of cycles N is represented in FIG. 5. It is apparent that the vanadium oxide $Li_{1+x}V_3O_8$ provides, for a depth of discharge of 100%, a constant capacity of 180 Ah.kg$^{-1}$ of active material, i.e. an energy of 450 Wh/kg of $Li_{1+x}V_3O_8$ (average potential~2.5 V). A projection for the end of life (defined as the number of cycles after which a complete at once discharge makes it possible to recover only 80% of the initial capacity) of greater than 1350 cycles is obtained.

What is claimed is:

1. A lithium vanadium oxide which corresponds to the formula $Li_{1+x}V_3O_8$ in which $0.1 \leq x \leq 0.25$, which has a monoclinic crystalline structure and which comprises nonagglomerated grains in the form of monocrystalline rods:
   which have a length L of between 1 and 100 μm, a width w such that 4<L/w<100, and a thickness t such that 4<L/t<100, with t<w;
   the elongation axis of which is the b axis of the monoclinic unit cell.

2. The oxide as claimed in claim 1, wherein the respective dimensions of the grains are such that 10<L/w<50 and 10<L/t<50.

3. A process for the preparation of a lithium vanadium oxide as claimed in claim 1, which comprises reacting at least one Li precursor with at least one vanadium precursor, wherein:
   the Li precursor(s) and the V precursor(s) in powder form are introduced into a mixer in the stoichiometric proportions Li/V=(1+x)/3;
   the mixing is carried out under conditions such that, after the mixing, the density of the mixture obtained is less than 1.5 and the dimensions of the powder grains are such that their length is greater than 1 μm, their width is greater than 0.1 μm and their thickness is greater than 0.1 μm;
   the mixture obtained is brought to a temperature of between 565° C. and 585° C. and this temperature is maintained for a period of time of between 30 mm and 10 h;
   the product obtained is deagglomerated in order to separate the powder grains without milling them.

4. The process as claimed in claim 3, wherein the lithium precursor is a lithium salt or a lithium oxide.

5. The process as claimed in claim 3, wherein the lithium precursor is chosen from $Li_2CO_3$, $LiNO_3$, LiOH, LiOH·H$_2$O and $Li_2O$ or from lithium acetate, lithium acetylacetonate, lithium stearate, lithium formate, lithium oxalate, lithium citrate, lithium lactate, lithium tartrate or lithium pyruvate.

6. The process as claimed in claim 3, wherein the vanadium precursor is a vanadium salt or a vanadium oxide.

7. The process as claimed in claim 3, wherein the vanadium precursor is chosen from α-$V_2O_5$, $NH_4VO_3$, $V_2O_4$ and $V_2O_3$.

8. The process as claimed in claim 3, wherein the lithium precursor is a mixed compound of Li and of V.

9. The process as claimed in claim 3, wherein heating is carried out at a temperature between 575° C. and 585° C.

10. A positive electrode for a lithium battery, which comprises, as active material, a lithium vanadium oxide as claimed in claim 1.

11. The electrode as claimed in claim 10, which additionally comprises a material which confers electron conduction properties and a composite material which confers ionic conduction properties and mechanical properties.

12. The electrode as claimed in claim 11, wherein the content of material which confers electron conduction properties is from 5% to 20% by weight.

13. the electrode as claimed in claim 11, wherein the content of composite material which confers the ionic conduction and the mechanical properties is between 5% and 40% by weight.

14. The electrode as claimed in claim 11, wherein the composite material which confers the ionic conduction and the mechanical properties is composed of a lithium salt and of a binder composed of a nonsolvating polymer and at least one polar aprotic compound.

15. The electrode as claimed in claim 11, wherein the composite material which confers the ionic conduction and the mechanical properties is composed of a lithium salt and of a binder composed of a solvating polymer.

16. The electrode as claimed in claim 15, wherein the solvating polymer is a copolymer of oxyethylene and of epichlorohydrin.

17. The electrode as claimed in claim 11, wherein the material which confers the electron conduction is a carbon black.

18. The electrode as claimed in claim 10, wherein the active material content is from 40 to 90% by weight.

19. A rechargeable lithium battery comprising a positive electrode and a negative electrode separated by an electrolyte comprising a lithium salt in solution in a solvent, the operation of which is provided by the reversible circulation of lithium ions between the electrodes, wherein the positive electrode is an electrode as claimed in claim 10.

20. The battery as claimed in claim 19, wherein the electrolyte comprises a lithium salt chosen from $LiClO_4$, $LiAsF_6$, $LiPF_6$, $LiBF_4$, $LiR_FSO_3$, $LiCH_3SO_3$, $LiN(R_FSO_2)_2$, $LiC(R_FSO_2)_3$ and $LiCF(R_FSO_2)_2$, and $R_F$ representing a perfluoroalkyl group having from 1 to 8 carbon atoms or a fluorine atom.

21. The battery as claimed in claim 19, wherein the solvent of the electrolyte is a polar aprotic compound chosen from linear or cyclic carbonates, linear or cyclic ethers, linear or cyclic esters, linear or cyclic sulfones, sulfamides and nitriles.

22. The battery as claimed in claim 21, further comprising a succession of layers composed respectively of the material of the positive electrode and its current collector, a separator impregnated by the liquid electrolyte, and the material constituting the negative electrode and optionally its current collector.

23. The battery as claimed in claim 19, wherein the solvent of the electrolyte is a solvating polymer.

24. The battery as claimed in claim 23, further comprising a succession of layers composed respectively of the material of the positive electrode and its current collector, the electrolyte composed of a lithium salt in solution in a solvating polymer, and the negative electrode and optionally its current collector.

25. The battery as claimed in claim 19, wherein the electrolyte is composed of a solid solution of lithium bistrifluoromethanesulfonimide (LiTFSI) in a polyoxyethylene or in a copolymer of oxyethylene and of epichlorohydrin, optionally comprising an inorganic filler.

26. The battery as claimed in claim 19, wherein the negative electrode is composed of lithium metal or of a lithium alloy in a matrix, or Li-Al-Mn.

27. The battery as claimed in claim 26, wherein the lithium alloy includes β-LiAl, γ-LiAl, Li-Pb, Li-Cd-Pb, Li-Sn, Li-Sn-Cd, and Li-Sn.

28. The battery as claimed in claim 27, wherein the matrix is an oxygen-comprising matrix or metal matrix.

29. The battery as claimed in claim 28, wherein the matrix is a metal matrix of Cu, Ni, Fe, or FeC.

30. The battery as claimed in claim 19, wherein the negative electrode is a composite electrode composed of a binder and a material capable of reversibly inserting lithium ions at low redox potential, said composite material being lithiated during a preliminary stage.

31. The battery as claimed in claim 19, wherein the negative electrode is a composite electrode of $Li/Li_3N$ or $Li_xPb$-polyparaphenylene.

32. A positive electrode for a lithium battery, which comprises, as active material, a lithium vanadium oxide as claimed in claim 2.

33. A rechargeable lithium battery comprising a positive electrode and a negative electrode separated by an electrolyte comprising a lithium salt in solution in a solvent, the operation of which is provided by the reversible circulation of lithium ions between the electrodes, wherein the positive electrode is an electrode as claimed in claim 11.

34. A rechargeable lithium battery comprising a positive electrode and a negative electrode separated by an electrolyte comprising a lithium salt in solution in a solvent, the operation of which is provided by the reversible circulation of lithium ions between the electrodes, wherein the positive electrode is an electrode as claimed in claim 18.

35. A rechargeable lithium battery comprising a positive electrode and a negative electrode separated by an electrolyte comprising a lithium salt in solution in a solvent, the operation of which is provided by the reversible circulation of lithium ions between the electrodes, wherein the positive electrode is an electrode as claimed in claim 12.

36. A rechargeable lithium battery comprising a positive electrode and a negative electrode separated by an electrolyte comprising a lithium salt in solution in a solvent, the operation of which is provided by the reversible circulation of lithium ions between the electrodes, wherein the positive electrode is an electrode as claimed in claim 13.

37. A rechargeable lithium battery comprising a positive electrode and a negative electrode separated by an electrolyte comprising a lithium salt in solution in a solvent, the operation of which is provided by the reversible circulation of lithium ions between the electrodes, wherein the positive electrode is an electrode as claimed in claim 14.

38. A rechargeable lithium battery comprising a positive electrode and a negative electrode separated by an electrolyte comprising a lithium salt in solution in a solvent, the operation of which is provided by the reversible circulation of lithium ions between the electrodes, wherein the positive electrode is an electrode as claimed in claim 15.

39. A rechargeable lithium battery comprising a positive electrode and a negative electrode separated by an electrolyte comprising a lithium salt in solution in a solvent, the operation of which is provided by the reversible circulation of lithium ions between the electrodes, wherein the positive electrode is an electrode as claimed in claim 16.

40. A rechargeable lithium battery comprising a positive electrode and a negative electrode separated by an electrolyte comprising a lithium salt in solution in a solvent, the operation of which is provided by the reversible circulation of lithium ions between the electrodes, wherein the positive electrode is an electrode as claimed in claim 17.

\* \* \* \* \*

UNITED STATES PATENT AND TRADEMARK OFFICE
CERTIFICATE OF CORRECTION

PATENT NO. : 7,396,614 B2
APPLICATION NO. : 10/493758
DATED : July 8, 2008
INVENTOR(S) : Severine Jouanneau et al.

Page 1 of 1

It is certified that error appears in the above-identified patent and that said Letters Patent is hereby corrected as shown below:

Add the following Assignee information to the cover of the Patent at item (73):

-- ELECTRICITE DE FRANCE, SERVICE NATIONAL, Paris (FR) --.

Signed and Sealed this
Eighth Day of February, 2011

David J. Kappos
*Director of the United States Patent and Trademark Office*